(12) United States Patent
Abderrazag et al.

(10) Patent No.: US 8,755,268 B2
(45) Date of Patent: Jun. 17, 2014

(54) COMMUNICATING INFORMATION IN AN INFORMATION HANDLING SYSTEM

(75) Inventors: Alexander Abderrazag, Letchworth Garden City (GB); Susan K. Schreitmueller, Spicewood, TX (US); Anna W. Topol, Jefferson Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 793 days.

(21) Appl. No.: 12/963,719

(22) Filed: Dec. 9, 2010

(65) Prior Publication Data

US 2012/0147738 A1   Jun. 14, 2012

(51) Int. Cl.
 *G06F 11/00* (2006.01)
(52) U.S. Cl.
 USPC ........................................................ 370/221
(58) Field of Classification Search
 CPC ..................... G06F 11/2005; G06F 11/2012; G06F 11/2007; G06F 11/2002
 USPC .......... 370/221, 222, 223, 224, 225, 216, 217
 See application file for complete search history.

(56) References Cited

U.S. PATENT DOCUMENTS

| | | | | |
|---|---|---|---|---|
| 5,959,968 | A * | 9/1999 | Chin et al. | 370/216 |
| 7,003,645 | B2 | 2/2006 | Knop et al. | |
| 7,308,612 | B1 * | 12/2007 | Bishara | 714/43 |
| 7,414,985 | B1 | 8/2008 | Tedijanto et al. | |
| 7,630,412 | B2 | 12/2009 | Wright et al. | |
| 2007/0140250 | A1 | 6/2007 | McAllister et al. | |
| 2007/0260910 | A1 | 11/2007 | Jain et al. | |
| 2007/0294596 | A1 | 12/2007 | Gissel et al. | |
| 2008/0080544 | A1 | 4/2008 | Mani et al. | |
| 2008/0270823 | A1 | 10/2008 | Hare et al. | |
| 2008/0291826 | A1 | 11/2008 | Licardie et al. | |
| 2008/0313369 | A1 * | 12/2008 | Verdoorn et al. | 710/62 |
| 2010/0118886 | A1 | 5/2010 | Saavedra | |
| 2010/0157844 | A1 | 6/2010 | Casey et al. | |

OTHER PUBLICATIONS

Watanabe, et al.; "Impact of Topology and Link Aggregation on a PC Cluster with Ethernet"; 2008 IEEE International Conference on Cluster Computing; pp. 280-285.
Zhou, et al.; "Aggregation of Multiple Ethernet Links within Network Subsystem"; Proceedings of the 2004 IEEE International Conference on Networking, Sensing & Control; Mar. 21-23, 2004; pp. 128-133; Taipei, Taiwan.
"IBM PowerHA System Mirror for AIX", IBM.com, Aug. 13, 2010,. found on the world wide web at: http://web.archive.org/web/20100813091929/http://www-03.ibm.com/systems/power/software/availability/aix/index.html.
"Tivoli System Automation for Multiplatforms", IBM.com, Sep. 11, 2010, found on the world wide web at: http://web.archive.org/web/20100911172622/http://www-01.ibm.com/software/tivoli/products/sys-auto-multi/.

(Continued)

*Primary Examiner* — Thai Nguyen
(74) *Attorney, Agent, or Firm* — Paul S. Drake

(57) ABSTRACT

A node communicates with a first network through a link aggregation of at least one primary port and at least one backup port. The link aggregation is for rerouting a communication with the first network to occur through the backup port in response to a malfunction in the communication through the primary port. In response to a malfunction in the communication through the backup port, the node communicates with a second network.

23 Claims, 3 Drawing Sheets

(56) References Cited

OTHER PUBLICATIONS

"IBM RSCT", Wikipedia.com, Aug. 9, 2009, found on the world wide web at: http://en.wikipedia.org/w/index.php?title=IBM_RSCT&oldid=308250910.

"SNA with AIX Gigabit Ethernet Fast Failover, EtherChannel, Jumbo Frames, and Logical Host Ethernet Adapter", IBM.com, Feb. 14, 2006, found on the world wide web at: http://www-01.ibm.com/support/docview.wss?uid=swg21230236.

"EtherChannel", Wikipedia.com, Sep. 9, 2010, found on the world wide web at: http://en.wikipedia.org/w/index.php?title=EtherChannel&oldid=383783987.

"EtherChannel and IEEE 802.3ad Link Aggregation", IBM.com, found on the world wide web at: http://publib.boulder.ibm.com/infocenter/aix/v6r1/advanced/print.jsp?topic=/com.ibm.aix.commadmn/doc/commadmndita/etherchannel_intro.htm&topicIndexId=t0_6_4_3_26&isSinglePrint=true&.

"Ethernet Device Drivers", IBM.com, found on the world wide web at: http://publib.boulder.ibm.com/infocenter/aix/v6r1/advanced/print.jsp?topic=com.ibm.aix.kernelext/doc/kernextc/ethernet_dd.htm&topicIndexId=t0_10_5_7_10&isSinglePrint=true&.

\* cited by examiner

COMMUNICATING INFORMATION IN AN INFORMATION HANDLING SYSTEM

BACKGROUND

The disclosures herein relate in general to information handling systems, and in particular to communicating information in an information handling system.

In an information handling system, a high availability ("HA") solution attempts to protect against a single point of failure ("SPOF") that interferes with access to a software application and/or its data. Nevertheless, some HA solutions are potentially cumbersome (e.g., difficult to configure, test and diagnose) and/or relatively inefficient. For example, some HA solutions detect component failure in a relatively inefficient manner, and their recovery times are relatively long.

BRIEF SUMMARY

A node communicates with a first network through a link aggregation of at least one primary port and at least one backup port. The link aggregation is for rerouting a communication with the first network to occur through the backup port in response to a malfunction in the communication through the primary port. In response to a malfunction in the communication through the backup port, the node communicates with a second network.

DETAILED DESCRIPTION

Figure 1:
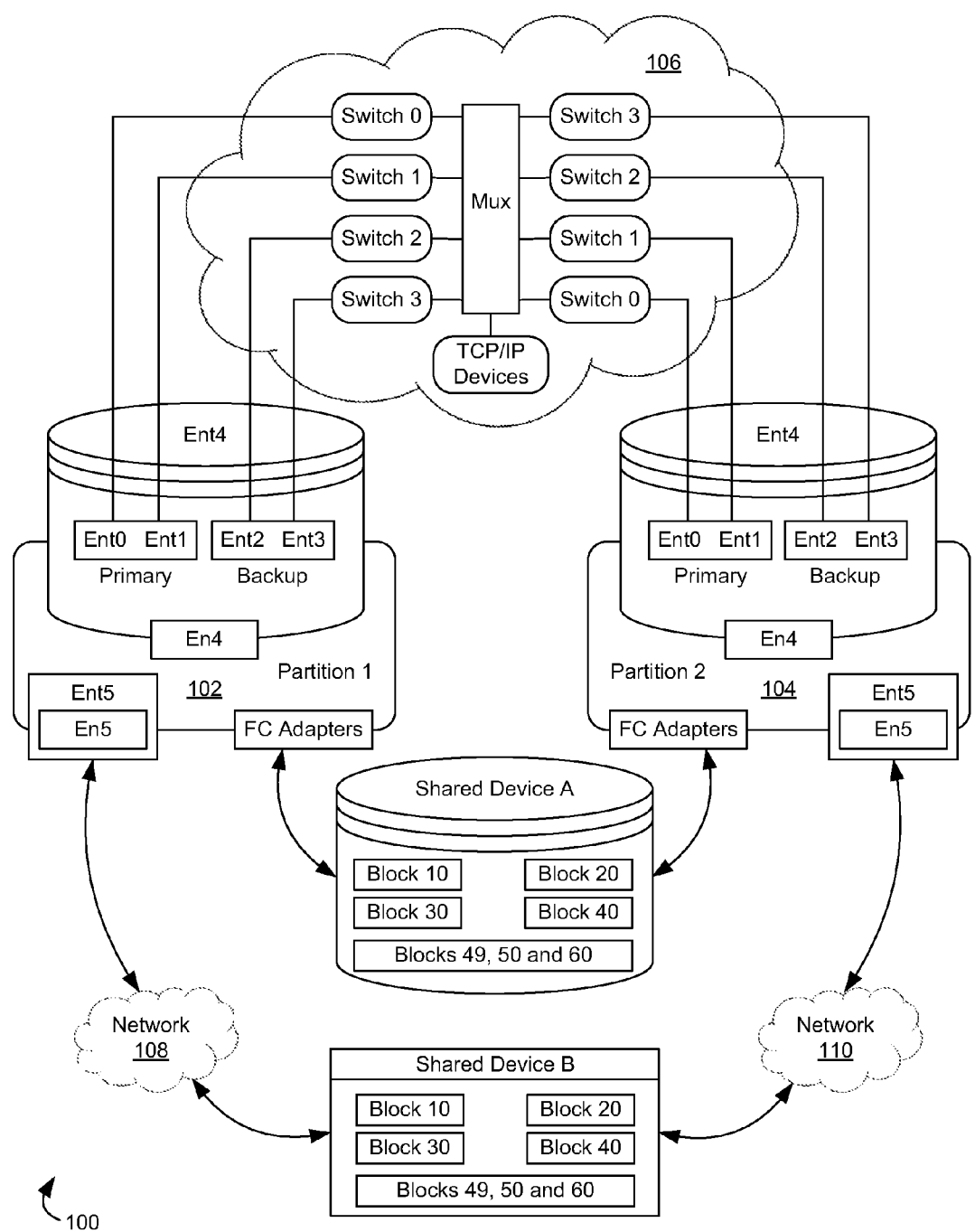
FIG. 1 is a block diagram of an information handling system of the illustrative embodiment.

FIG. 1 is a block diagram of an information handling system, indicated generally at 100, of the illustrative embodiment. The system 100 includes representative nodes 102 and 104, a shared device A, a shared device B, and representative networks 106, 108 and 110. In one example, the representative network 106 is a transport control protocol/Internet protocol ("TCP/IP") network, such as the Internet or an intranet.

For clarity, FIG. 1 shows two representative nodes 102 and 104, but techniques of the illustrative embodiment are likewise applicable to numerous additional nodes of the system 100. Together, multiple nodes form a cluster. In a first embodiment, each node (e.g., the representative node 102) is a symmetric multiprocessor ("SMP") computer system (e.g., server) that includes multiple processors coupled to a system bus for communicating information between such processors, which are not shown in FIG. 1 for clarity. In a second embodiment, at least one node is a single processor computer system.

As shown in the example of FIG. 1, the representative nodes 102 and 104 are substantially identical to one another. For example, in each node (e.g., the representative node 102), a single logical network adapter ent4 is formed by a link aggregation ("LA") of: (a) Ethernet ports ent0 and ent1 on a first physical dual-port Ethernet network interface card, which is the LA primary route; and (b) Ethernet ports ent2 and ent3 on a second physical dual-port Ethernet network interface card, which is the LA backup route. LA is an open standard (IEEE 802.3ad).

In the first physical dual-port Ethernet network interface card, the Ethernet port ent0 is a gigabit fast failover ("GFF") primary route, and the Ethernet port ent1 is a GFF backup route. In the second physical dual-port Ethernet network interface card, the Ethernet port ent2 is the GFF primary route, and the Ethernet port ent3 is the GFF backup route. The representative nodes 102 and 104 also include various other components (e.g., units, registers, buffers, memory controllers, caches, local memories, input/output ("I/O") bridges, I/O buses, I/O adapters, graphics adapters, disk adapters, and other devices, all of which are formed by integrated circuitry), which are not shown in FIG. 1 for clarity.

The representative nodes 102 and 104 are logically partitioned ("LPAR") information handling systems for simultaneously executing: (a) multiple heterogeneous operating systems; (b) multiple instances of a single operating system; and/or (c) one or more software programs within any such operating system. A node (e.g., the representative node 102) assigns such operating systems (and/or such instances thereof) to respective logical partitions, so that an operating system (e.g., AIX operating system from International Business Machines Corporation) accesses devices that are likewise assigned (by such node) to such operating system's respective logical partition. In one example, such node: (a) dispatches first, second and third logical partitions; (b) executes a first instance (or image) of a first operating system within the first logical partition; (c) executes a second instance (or image) of the first operating system within the second logical partition; and (d) executes a second operating system within the third logical partition.

As shown in the example of FIG. 1, the representative node 102: (a) dispatches a first logical partition ("Partition 1"); (b) assigns a logical network interface en4 to the Partition 1; (c) in association with the logical network interface en4, likewise assigns the logical network adapter ent4 (and its aggregated Ethernet ports ent0, ent1, ent2 and ent3) to the Partition 1; and (d) assigns various other devices to the Partition 1. Further, as shown in the example of FIG. 1, such node: (a) assigns a logical network interface en5 to the Partition 1; and (b) in association with the logical network interface en5, likewise assigns an Ethernet port ent5 to the Partition 1.

Similarly, as shown in the example of FIG. 1, the representative node 104: (a) dispatches a second logical partition ("Partition 2"); (b) assigns a logical network interface en4 to the Partition 2; (c) in association with the logical network interface en4, likewise assigns the logical network adapter ent4 (and its aggregated Ethernet ports ent0, ent1, ent2 and ent3) to the Partition 2; and (d) assigns various other devices to the Partition 2. Further, as shown in the example of FIG. 1, such node: (a) assigns a logical network interface en5 to the Partition 2; and (b) in association with the logical network interface en5, likewise assigns an Ethernet port ent5 to the Partition 2.

The logical network interface en4 has an assigned IP address for its associated logical network adapter ent4. Similarly, the logical network interface en5 has an assigned IP address for its associated Ethernet port ent5. The assigned IP address of the logical network interface en4 of the Partition 1 may (but is not required to) be in a different network from an assigned IP address of the logical network interface en4 of the Partition 2. In one example, the Partitions 1 and 2 are located in the same information processing center, and the assigned IP address of the logical network interface en4 of the Partition 1 is different from (yet within the same network as) the assigned IP address of the logical network interface en4 of the Partition 2. In such example: (a) the assigned IP address of the logical network interface en4 of the Partition 1 is a first Class C network address, such as 192.168.1.1; and (b) the assigned IP address of the logical network interface en4 of the Partition 2 is a second Class C network address, such as 192.168.1.2, where 192.168.1 identifies the network.

In response to execution of the Partition 1, the representative node 102 communicates information as streams of IP-based Internet Control Message Protocol ("ICMP") packets through one or more of the aggregated Ethernet ports (ent0, ent1, ent2 and/or ent3) of its logical network adapter ent4 (which operates under control of such adapter's associated logical network interface en4 of the Partition 1). Similarly, in response to execution of the Partition 2, the representative node 104 communicates information as streams of IP-based ICMP packets through one or more of the aggregated Ethernet ports (ent0, ent1, ent2 and/or ent3) of its logical network adapter ent4 (which operates under control of such adapter's associated logical network interface en4 of the Partition 2).

The aggregated Ethernet ports (ent0, ent1, ent2 and ent3) of the representative node 102 are coupled to TCP/IP devices of the network 106 through a first group of switches (switch 0, switch 1, switch 2 and switch 3, respectively) via a multiplexer ("Mux") of the network 106, as shown in FIG. 1. Similarly, the aggregated Ethernet ports (ent0, ent1, ent2 and ent3) of the representative node 104 are coupled to the TCP/IP devices of the network 106 through a second group of switches (switch 0, switch 1, switch 2 and switch 3, respectively) via the Mux of the network 106, as shown in FIG. 1. Accordingly, the Mux of the network 106 is operable to connect the TCP/IP devices of the network 106 to any of those switches.

Also, the aggregated Ethernet ports (ent0, ent1, ent2 and ent3) of the representative node 102 are coupled to the aggregated Ethernet ports (ent0, ent1, ent2 and ent3) of the representative node 104, and vice versa, through the first and second groups of switches via the Mux of the network 106, as shown in FIG. 1. Accordingly, the Mux of the network 106 is operable to connect any first switch (from among the first group of switches) to any second switch (from among the second group of switches).

In a first example: (a) the Partitions 1 and 2 are located in the same information processing center; and (b) the same TCP/IP devices of the network 106 are coupled to the aggregated Ethernet ports (ent0, ent1, ent2 and ent3) of the representative node 102, and to the aggregated Ethernet ports (ent0, ent1, ent2 and ent3) of the representative node 104. In a second example: (a) the Partitions 1 and 2 are located in different information processing centers; (b) a first subset of the TCP/IP devices of the network 106 is coupled to the aggregated Ethernet ports (ent0, ent1, ent2 and ent3) of the representative node 102; and (c) a second subset of the TCP/IP devices of the network 106 is coupled to the aggregated Ethernet ports (ent0, ent1, ent2 and ent3) of the representative node 104.

The logical network interface en4 of the Partition 1 (and its associated logical network adapter ent4 and the aggregated Ethernet ports ent0, ent1, ent2 and ent3 thereof), the logical network interface en4 of the Partition 2 (and its associated logical network adapter ent4 and the aggregated Ethernet ports ent0, ent1, ent2 and ent3 thereof), and the network 106 (and its TCP/IP devices and first and second groups of switches) together form a primary network infrastructure for communicating information over an unlimited geographic distance (e.g., without geographic distance limitation between nodes, such as the representative nodes 102 and 104).

Through the primary network infrastructure, "heartbeat" information is communicated as streams of ICMP packets: (a) between the logical network interface en4 of the Partition 1 (via its associated logical network adapter ent4) and the TCP/IP devices (of the network 106); (b) between the logical network interface en4 of the Partition 2 (via its associated logical network adapter ent4) and the TCP/IP devices (of the network 106); and (c) between the logical network interface en4 of the Partition 1 (via its associated logical network adapter ent4) and the logical network interface en4 of the Partition 2 (via its associated logical network adapter ent4). In response to such "heartbeat" information: (a) the representative node 102 determines whether it is able to suitably communicate with the TCP/IP devices, and with the representative node 104, through the primary network infrastructure; and (b) similarly, the representative node 104 determines whether it is able to suitably communicate with the TCP/IP devices, and with the representative node 102, through the primary network infrastructure.

The logical network interface en5 of the Partition 1 (and its associated Ethernet port ent5), the logical network interface en5 of the Partition 2 (and its associated Ethernet port ent5), fibre channel ("FC") adapters of the Partition 1, FC adapters of the Partition 2, the representative networks 108 and 110, the shared device A, and the shared device B together form a secondary network infrastructure for communicating "heartbeat" information between nodes (e.g., between the representative nodes 102 and 104), without reliance on a TCP/IP protocol. The shared device A and the shared device B are computer readable storage media. In the example of FIG. 1: (a) the shared device A is a shared disk (or part of a shared disk) of a storage area network, without logical volume manager configurations; and (b) the shared device B is a UNIX file accessed through a network file system (e.g., hosted by one or more computer servers) for storing one or more UNIX files, such as network file system ("NFS"), Andrew file system ("AFS") or distributed file system ("DFS"). In another example, the shared device A is the same type of device as the shared device B, or vice versa.

The secondary network infrastructure is for communicating such "heartbeat" information: (a) over a limited geographic distance between the shared device A and the FC adapters of the Partition 1; (b) over a limited geographic distance between the shared device A and the FC adapters of the Partition 2; (c) over an unlimited geographic distance between the shared device B and the shared logical network interface en5 of the Partition 1 via the network 108; and (d) over an unlimited geographic distance between the shared device B and the shared logical network interface en5 of the Partition 2 via the network 110. By operating without reliance on TCP/IP communication, the secondary network infrastructure operates in a relatively secure and reliable manner.

Accordingly, the representative node 102 further communicates such "heartbeat" information to the representative node 104 (and vice versa) through the secondary network infrastructure. For example, even if a malfunction occurs in communication through the primary network infrastructure: (a) the representative node 102 determines whether the representative node 104 is up=active (e.g., operational) in response to such communication through the secondary network infrastructure; and (b) likewise, the representative node 104 determines whether the representative node 102 is up=active in response to such communication through the secondary network infrastructure. When the representative node 102 communicates such "heartbeat" information to the representative node 104 (and vice versa) through the secondary network infrastructure, such "heartbeat" information is stored in both the shared device A and the shared device B. In that manner, such "heartbeat" information is "mirrored" between the shared device A and the shared device B, so that: (a) the shared device A operates as a primary shared device; and (b) the shared device B operates as a secondary shared device. For example, in response to the shared device A becoming inaccessible to a node (e.g., the representative node 102), such node outputs a command to other node(s) (e.g., the representative node 104) for instructing such other node(s) to communicate such "heartbeat" information through the shared device B instead of the shared device A.

In each of the shared device A and the shared device B: (a) the block 10 is controlled by operations of the Partition 1 for storing such "heartbeat" information; and (b) the block 20 is controlled by operations of the Partition 2 for storing such "heartbeat" information. Also, in each of the shared device A and the shared device B: (a) the block 30 is controlled by operations of application daemons for storing a status (e.g., "down," "starting," "up," "start failed," "stop failed," "stopping," "move stop" or "move start") of a first application; and (b) the block 40 is controlled by operations of application daemons for storing a status of a second application. Accordingly, even if the nodes are partitioned, the system 100 stores the status of such applications in the blocks 30 and 40, which thereby protects against risk of data divergence from execution of a same application by the representative nodes 102 and 104.

Further, in each of the shared device A and the shared device B, the blocks 49, 50 and 60 are controlled by operations of the nodes in accordance with a disk command execution ("DCE") protocol of the system 100. In accordance with such DCE protocol, the nodes communicate messages (e.g., commands) to one another by writing and reading such messages in the blocks 49, 50 and 60 of the secondary network infrastructure. For example, a human user may operate a node for communicating such messages to one or more other nodes by writing and reading such messages in the blocks 49, 50 and 60 of the secondary network infrastructure, in accordance with such DCE protocol.

The shared device A has a respective lock flag, which is: (a) set by a first node (e.g., the representative node 102) in response to its writing of a message to a second node (e.g., the representative node 104) via the shared device A; and (b) cleared by the second node in response to its reading of the message via the shared device A. For example, if the message from the first node is a command for execution by the second node, then the second node: (a) reads such command from the shared device A; (b) executes such command in response thereto; and (c) clears the respective lock flag in response to its reading and execution of such command. Similarly, the shared device B has a respective lock flag, which is: (a) set by the first node in response to its writing of the message to the second node via the shared device B; and (b) cleared by the second node in response to its reading of the message via the shared device B.

In an illustrative embodiment, the Partition 1 performs operations for: (a) incrementing counters in the blocks 10 of the shared devices A and B; (b) reading counters in the blocks 20 of the shared devices A and B, and determining whether such counters in the blocks 20 have been incremented by the Partition 2; (c) if such counters in the blocks 20 have been incremented by the Partition 2, then determining that the Partition 2 is up=active; and (d) if such counters in the blocks 20 have not been incremented by the Partition 2 during a first time period (e.g., 5 seconds), nor during a successive second time period, nor during a successive third time period, then determining that the Partition 2 is down=inactive.

Similarly, the Partition 2 performs operations for: (a) incrementing counters in the blocks 20 of the shared devices A and B; (b) reading counters in the blocks 10 of the shared devices A and B, and determining whether such counters in the blocks 10 have been incremented by the Partition 1; (c) if such counters in the blocks 10 have been incremented by the Partition 1, then determining that the Partition 1 is active; and (d) if such counters in the blocks 10 have not been incremented by the Partition 1 during a first time period, nor during a successive second time period, nor during a successive third time period, then determining that the Partition 1 is inactive.

Figure 2:
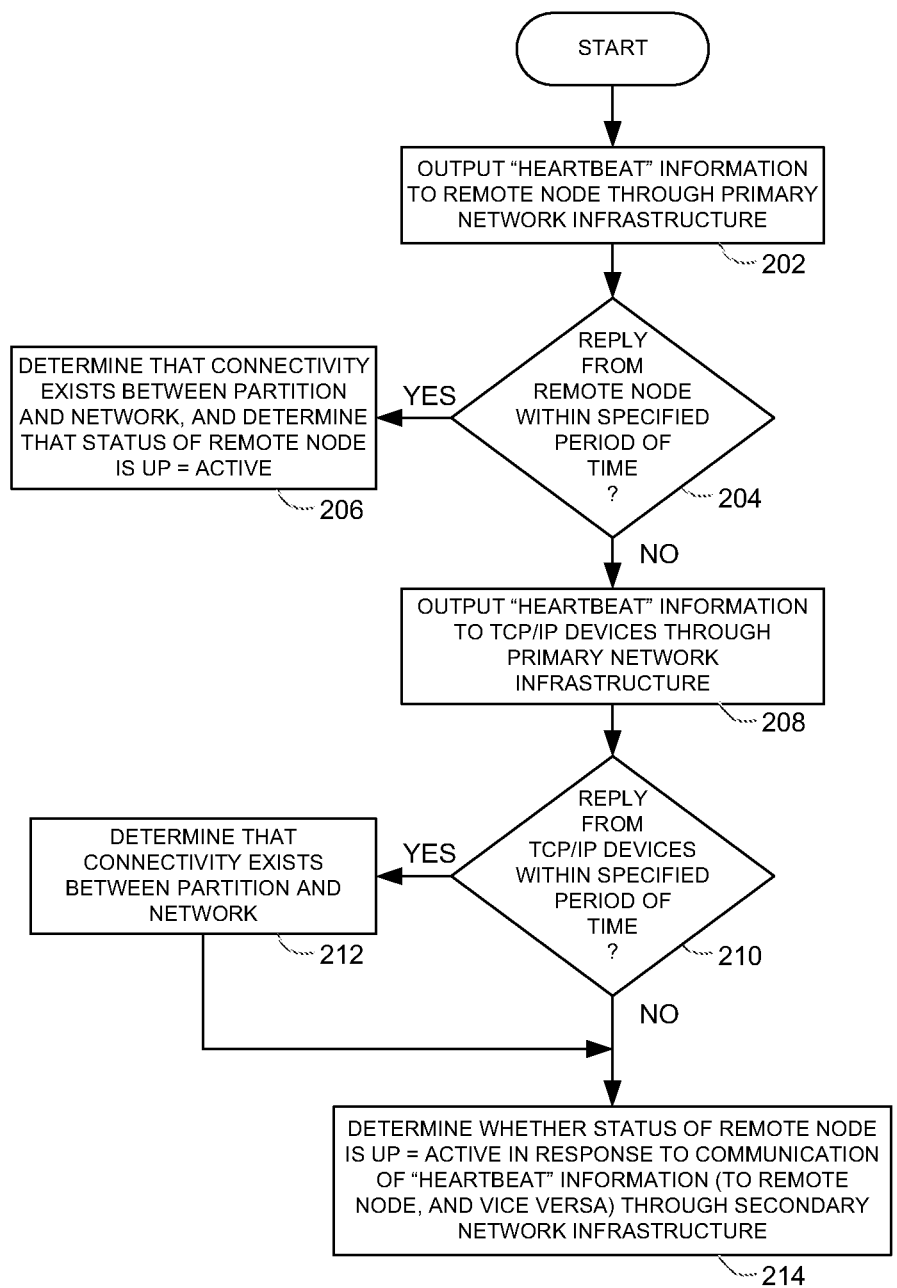
FIG. 2 is a flowchart of an example operation performed by a representative node of the system of FIG. 1.

FIG. 2 is a flowchart of an example operation performed by the representative node 102. Through the primary network infrastructure, a node (e.g., the representative node 102) communicates "heartbeat" information as streams of ICMP packets through one or more of the aggregated Ethernet ports (ent0, ent1, ent2 and/or ent3) of such node's logical network adapter ent4 (which operates under control of such adapter's associated logical network interface en4), as discussed further hereinabove. By communicating such "heartbeat" information through such node's single logical network adapter ent4, instead of through multiple adapters at the HA software layer, the system 100 increases efficiency of its operations.

For example, such node's single logical network adapter ent4 initially communicates such "heartbeat" information through such node's Ethernet port ent0 (which is the GFF primary route of such node's first physical dual-port Ethernet network interface card) and such port's connected switch 0 of the network 106. In response to a malfunction in such communication through such node's Ethernet port ent0, such node's single logical network adapter ent4 automatically (within a relatively short amount of time, such as within 3 milliseconds with zero Ethernet packet loss) reroutes such communication to occur through such node's Ethernet port ent1 (which is the GFF backup route of such node's first physical dual-port Ethernet network interface card) and such port's connected switch 1 of the network 106. In response to malfunctions in such communication through such node's Ethernet ports ent0 and ent1, such node's single logical network adapter ent4 automatically (within a relatively short amount of time, such as within less than one second) reroutes such communication to occur through such node's Ethernet port ent2 (which is the GFF primary route of such node's second physical dual-port Ethernet network interface card) and such port's connected switch 2 of the network 106. In response to malfunctions in such communication through such node's Ethernet ports ent0, ent1 and ent2, such node's single logical network adapter ent4 automatically (within a relatively short amount of time, such as within 3 milliseconds with zero Ethernet packet loss) reroutes such communication to occur through such node's Ethernet port ent3 (which is the GFF backup route of such node's second physical dual-port Ethernet network interface card) and such port's connected switch 3 of the network 106. Such communication is managed by daemon software programs, which the nodes (e.g., the representative nodes 102 and 104) execute as background processes.

In response to such communication of "heartbeat" information through the primary network infrastructure, the representative node 102 determines: (a) connectivity between its partition (e.g., the Partition 1) and the network 106 (e.g., the first group of switches and TCP/IP devices of the network 106); (b) connectivity between its partition (e.g., the Partition 1) and a remote node's partition (e.g., Partition 2); and (c)

status (e.g., up=active, or down=inactive) of such remote node (e.g., the representative node 104). Likewise, in response to such communication of "heartbeat" information through the primary network infrastructure, the representative node 104 determines: (a) connectivity between its partition (e.g., the Partition 2) and the network 106 (e.g., the second group of switches and TCP/IP devices of the network 106); (b) connectivity between its partition (e.g., the Partition 2) and a remote node's partition (e.g., Partition 1); and (c) status (e.g., up=active, or down=inactive) of such remote node (e.g., the representative node 102).

Accordingly, the system 100 implements multiple tiers of communication, which achieve higher levels of resilience against hardware component failure. In one example operation, the representative node 102:

(a) at a step 202, outputs such "heartbeat" information to a remote node (e.g., the representative node 104) through the primary network infrastructure;

(b) at a next step 204, determines whether it has received a reply from such remote node within a specified period of time;

(c) in response to such reply from such remote node, determines (at a step 206) that connectivity exists between its partition (e.g., the Partition 1) and the network 106, and between its partition (e.g., the Partition 1) and such remote node's partition (e.g., Partition 2), so that the status of such remote node is up=active;

(d) in response to absence of such reply from such remote node, outputs (at a step 208) such "heartbeat" information to TCP/IP devices of the network 106 through the primary network infrastructure (e.g., to first, second and/or third TCP/IP devices);

(e) at a next step 210, determines whether it has received a reply from such TCP/IP devices within a specified period of time;

(f) in response to such reply from such TCP/IP devices, determines (at a step 212) that connectivity exists between its partition (e.g., the Partition 1) and the network 106, and determines that connectivity is absent between its partition (e.g., the Partition 1) and such remote node's partition (e.g., Partition 2) through the primary network infrastructure; and (g) at a next step 214, determines whether the status of such remote node is up=active in response to communication of such "heartbeat" information (to such remote node, and vice versa) through the secondary network infrastructure, as discussed further hereinabove.

Figure 3:
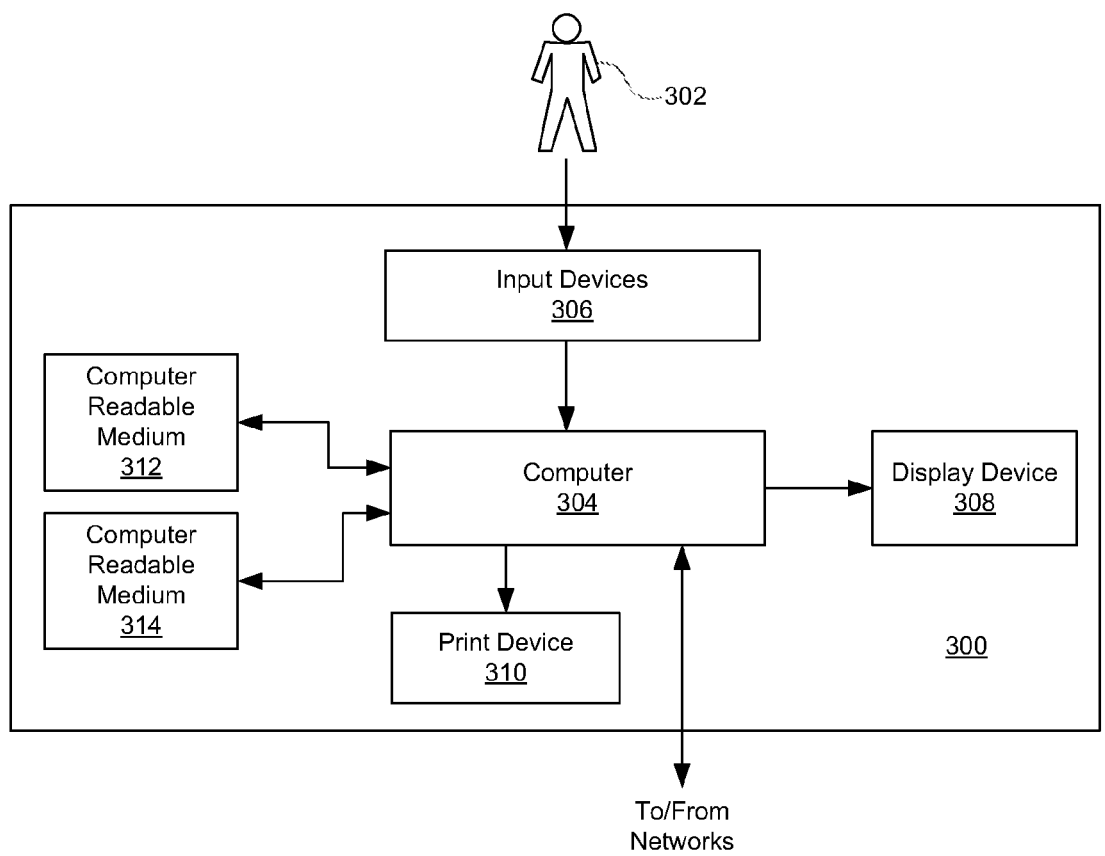
FIG. 3 is a block diagram of a representative node of the system of FIG. 1.

FIG. 3 is a block diagram of a representative node (e.g., the representative node 102), which is an information handling system ("IHS") 300 of the illustrative embodiment. In the example of FIG. 3, the system 300 operates in association with a human user 302. The system 300 is formed by various electronic circuitry components, including: (a) a general purpose computer 304, which is a general purpose computational resource for executing and otherwise processing instructions, and for performing additional operations (e.g., communicating information) in response thereto; (b) input devices 306 for receiving information from the user 302; (c) a display device 308 (e.g., a conventional flat panel monitor) for displaying information to the user 302; (d) a print device 310 (e.g., a conventional electronic printer) for printing visual images on paper; (e) a computer readable medium (or apparatus) 312 (e.g., a solid state drive) for storing information; (f) a portable computer readable medium (or apparatus) 314 (e.g., a removable flash memory card or CD-ROM) for storing information; and (g) various other electronic circuitry for performing other operations of the system 300.

For example, the computer 304 includes: (a) a network interface (e.g., circuitry) for communicating between the computer 304 and networks (e.g., outputting information to, and receiving information from, the networks), such as by transferring information (e.g. instructions, data, signals) between the computer 304 and the networks; and (b) a memory device (e.g., RAM device and/or ROM device) for storing information (e.g., instructions of software executed by the computer 304, and data processed by the computer 304 in response to such instructions). Accordingly, in the example of FIG. 3, the computer 304 is connected to the input devices 306, the display device 308, the print device 310, the computer readable medium 312, the computer readable medium 314 and the networks, as shown in FIG. 3. The computer 304 executes: (a) operating system software for performing general purpose tasks; and (b) other processes and applications.

In response to signals from the computer 304, the display device 308 displays visual images, which represent information, and the user 302 views such visual images. Moreover, the user 302 operates the input devices 306 to output information to the computer 304, and the computer 304 receives such information from the input devices 306. Also, in response to signals from the computer 304, the print device 310 prints visual images on paper, and the user 302 views such visual images.

The input devices 306 include, for example, a conventional electronic keyboard and a pointing device, such as a conventional electronic "mouse." The user 302 operates the keyboard to output alphanumeric text information to the computer 304, which receives such alphanumeric text information. The user 302 operates the pointing device to output cursor-control information to the computer 304, which receives such cursor-control information. The input devices 306 also include, for example, touch-sensitive circuitry of a liquid crystal display ("LCD") device.

As will be appreciated by one skilled in the art, aspects of the illustrative embodiments may be embodied as a system, method or computer program product. Accordingly, aspects of the illustrative embodiments may take the form of an entirely hardware embodiment, an entirely software embodiment (including, but not limited to, firmware, resident software, or microcode) or an embodiment combining software and hardware aspects that may all generally be referred to herein as a "circuit," "module" or "system." Furthermore, aspects of the illustrative embodiments may take the form of a computer program product embodied in one or more computer readable medium(s) having computer readable program code embodied thereon.

Any combination of one or more computer readable medium(s) may be used in the illustrative embodiment. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory ("RAM"), a read-only memory ("ROM"), an erasable programmable read-only memory ("EPROM" or flash memory), an optical fiber, a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium (including, but not limited to, wireless, wireline, optical fiber cable, RF, or any suitable combination of the foregoing).

Computer program code for carrying out operations for aspects of the illustrative embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer, and partly on a remote computer or entirely on the remote computer or server. The remote computer may be connected to the user's computer through any type of network, including a local area network ("LAN") or a wide area network ("WAN"), or the connection may be made to an external computer (for example, through the Internet using an Internet Service Provider).

Aspects of the illustrative embodiments are described with reference to flowchart illustrations and/or block diagrams of methods, apparatus (systems) and computer program products according to the illustrative embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions (which execute via the processor of the computer or other programmable data processing apparatus) are processable to cause performance of the functions/acts specified in the flowchart and/or block diagram block or blocks.

These computer program instructions may also be stored in a computer readable medium that can direct a computer, other programmable data processing apparatus, or other devices to operate in a particular manner, such that the instructions stored in the computer readable medium produce an article of manufacture, including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process, such that the instructions that execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to the illustrative embodiments. In this regard, each block in the flowchart or block diagrams may represent a module, segment, or portion of code, which includes one or more executable instructions for implementing the specified logical operation(s). In some alternative implementations, the operations noted in the block may occur out of the order noted in the Figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flowchart illustration, can be implemented by special purpose hardware-based systems that perform the specified operations or acts, or combinations of special purpose hardware and computer instructions.

The terminology used herein is for the purpose of describing particular embodiments only and is not intended to be limiting of the inventions. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description herein has been presented for purposes of illustration and description, but is not intended to be exhaustive or limited to the inventions in the form disclosed. Many modifications and variations will be apparent to those of ordinary skill in the art without departing from the scope and spirit of the inventions. The embodiment was chosen and described in order to best explain the principles of the inventions and the practical application, and to enable others of ordinary skill in the art to understand the inventions for various embodiments with various modifications as are suited to the particular use contemplated.

What is claimed is:

1. A system for communicating information, comprising:
a computing node including first and second network interfaces, wherein the first network interface includes a first primary port and a first backup port, wherein the second network interface includes a second primary port and a second backup port, wherein the link aggregation is of the first primary port, the first backup port, the second primary port and the second backup port, wherein the computing node is for:
communicating with a second computing node across a first network through the link aggregation, wherein the link aggregation is for rerouting a communication with the first network to occur through the first backup port in response to a malfunction in the communication through the first primary port, rerouting the communication with the second computing node across the first network to occur through the second primary port in response to a malfunction in the communication through the first backup port, and rerouting the communication with the second computing node across the first network to occur through the second backup port in response to a malfunction in the communication through the second primary port; and communicating with the second computing node across a second network in response to a malfunction in the communication through the second backup port.

2. The system of claim 1, wherein the first computing node is for determining a connectivity between the first computing node and the first network, a connectivity between the first computing node and the second computing node, and a status of the second computing node.

3. The system of claim 2, wherein, in response to an absence of the connectivity between the first computing node and the second computing node through the first network, the first computing node is for determining the connectivity between the first computing node and the first network by communicating with a device of the first network through the link aggregation.

4. The system of claim 2, wherein, in response to an absence of the connectivity between the first computing node and the second computing node through the first network, the first computing node is for determining the status of the second computing node by communicating with the second computing node through the second network.

5. The system of claim 1, wherein the second network is a computer readable storage medium shared by the first and second computing nodes.

6. The system of claim 5, wherein: the first computing node outputs a command to the second computing node by writing the command in the computer readable storage medium; and the second computing node reads the command from the computer readable storage medium and executes the command in response thereto.

7. The system of claim 5, wherein the computer readable storage medium is a disk of a storage area network.

8. The system of claim 5, wherein the computer readable storage medium is a network file system.

9. The system of claim 1, wherein the first network is a TCP/IP network.

10. A method performed by an information handling system for communicating information, the method comprising:
communicating with a second node across a first network through a link aggregation of a first primary port, a first backup port, a second primary port and a second backup port, wherein a first network interface includes the first primary port and the first backup port, and a second network interface includes the second primary port and the second backup port, wherein the link aggregation is for rerouting a communication with the second node across the first network to occur through the first backup port in response to a malfunction in the communication through the first primary port, rerouting the communication with the second node across the second network to occur through the second primary port in response to a malfunction in the communication through the first backup port, and rerouting the communication with the second node across the second network to occur through the second backup port in response to a malfunction in the communication through the second primary port; and communicating with the second node across a second network in response to a malfunction in the communication through second backup port; wherein a first node includes the first and second primary ports and the first and second backup ports.

11. The method of claim 10, and comprising:
determining a connectivity between the first node and the first network, a connectivity between the first node and the second node, and a status of the second node.

12. The method of claim 11, wherein determining the connectivity between the first node and the first network comprises:
in response to an absence of the connectivity between the first node and the second node through the first network, determining the connectivity between the first node and the first network by communicating with a device of the first network through the link aggregation.

13. The method of claim 11, wherein determining the status of the second node comprises:
in response to an absence of the connectivity between the first node and the second node through the first network, determining the status of the second node by communicating with the second node through the second network.

14. The method of claim 10, wherein the second network is a computer readable storage medium shared by the first and second nodes.

15. The method of claim 14, and comprising:
outputting a command from the first node to the second node by: with the first node, writing the command in the computer readable storage medium; and
with the second node, reading the command from the computer readable storage medium and executing the command in response thereto.

16. The method of claim 14, wherein the computer readable storage medium is a disk of a storage area network.

17. The method of claim 14, wherein the computer readable storage medium is a network file system.

18. The method of claim 10, wherein the first network is a TCP/IP network.

19. A system for communicating information, comprising:
a first computing node including first and second network interfaces, wherein the first network interface includes a first primary port and a first backup port, wherein the second network interface includes a second primary port and a second backup port, wherein a link aggregation is of the first primary port, the first backup port, the second primary port and the second backup port, wherein the first node is for: communicating with a first network through the link aggregation, wherein the link aggregation is for rerouting a communication with the first network to occur through the first backup port in response to a malfunction in the communication through the first primary port, rerouting the communication with the first network to occur through the second primary port in response to a malfunction in the communication through the first backup port, and rerouting the communication with the first network to occur through the second backup port in response to a malfunction in the communication through the second primary port; and communicating with a second network in response to a malfunction in the communication through the second backup port;

a second computing node coupled through the first and second networks to the first computing node; and wherein the second network is a first computer readable storage medium shared by the first and second computing nodes; and wherein the first computing node is for determining a connectivity between the first computing node and the first network, a connectivity between the first computing node and second computing node, and a status of the second computing node.

20. The system of claim 19, wherein, in response to an absence of the connectivity between the first computing node and the second computing node through the first network, the first computing node is for determining the connectivity between the first computing node and the first network by communicating with a device of the first network through the link aggregation.

21. The system of claim 19, wherein, in response to an absence of the connectivity between the first computing node and the second computing node through the first network, the first computing node is for determining the status of the second computing node by communicating with the second computing node through the second network.

22. The system of claim 19, wherein: the first computing node outputs a command to the second computing node by writing the command in the first computer readable storage medium; and the second computing node reads the command from the computer readable storage medium and executes the command in response thereto.

23. The system of claim 19, wherein a second computer readable storage medium shared by the first and second computing nodes is utilized for communications between the first and second computing nodes if the first computer readable storage medium becomes inaccessible to either the first and second computing nodes.

* * * * *